United States Patent
Banerjee et al.

(10) Patent No.: US 6,732,116 B2
(45) Date of Patent: May 4, 2004

(54) METHOD AND SYSTEM FOR DYNAMICALLY MANAGING DATA STRUCTURES TO OPTIMIZE COMPUTER NETWORK PERFORMANCE

(75) Inventors: Dwip N. Banerjee, Austin, TX (US); David Marquardt, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 09/886,194

(22) Filed: Jun. 21, 2001

(65) Prior Publication Data

US 2003/0009482 A1 Jan. 9, 2003

(51) Int. Cl.⁷ .............................................. G06F 17/30
(52) U.S. Cl. ...................................................... 707/102
(58) Field of Search ......................................... 707/102

(56) References Cited

U.S. PATENT DOCUMENTS

| | | | | |
|---|---|---|---|---|
| 4,636,946 A | * | 1/1987 | Hartung et al. ............. | 711/136 |
| 5,287,499 A | * | 2/1994 | Nemes ........................... | 707/2 |
| 5,542,066 A | * | 7/1996 | Mattson et al. ............. | 711/136 |
| 5,592,432 A | * | 1/1997 | Vishlitzky et al. ...... | 365/230.03 |
| 5,751,993 A | * | 5/1998 | Ofek et al. .................. | 711/136 |
| 6,067,547 A | * | 5/2000 | Douceur ..................... | 707/100 |
| 6,067,608 A | * | 5/2000 | Perry .......................... | 711/203 |
| 6,286,080 B1 | * | 9/2001 | Galbraith et al. ........... | 711/113 |
| 6,453,360 B1 | * | 9/2002 | Muller et al. ............... | 709/250 |
| 6,530,008 B1 | * | 3/2003 | Lin et al. .................... | 711/171 |

* cited by examiner

*Primary Examiner*—Wayne Amsbury
(74) *Attorney, Agent, or Firm*—Thomas E. Tyson; Edmond A. DeFrank (57) ABSTRACT

A method and system for providing and dynamically managing the size of a storage space containing data structures depending on a current network load. The present invention expands the size of a storage space when the amount of data therein is large, thereby reducing the time spent searching for values within the data structure. When the amount of data within the storage space is small, the present invention contracts the size of the storage space to reduce the memory needed to maintain the storage space. In this manner, the present invention dynamically adjusts the size of the storage space in response to changing network loads to ensure that network performance remains optimized.

20 Claims, 6 Drawing Sheets

DYNAMIC DATA STRUCTURE EXPANSION

BASE DYNAMIC
DATA STRUCTURE

FIG. 5A

INCREASED
NETWORK LOAD

FIG. 5B

EXPANDED DYNAMIC
DATA STRUCTURE

FIG. 5C

FURTHER INCREASE
IN NETWORK LOAD

FIG. 5D

ADDING TO EXPANDED
DYNAMIC DATA STRUCTURE

FIG. 5E

DYNAMIC DATA STRUCTURE CONTRACTION

BASE DYNAMIC
DATA STRUCTURE

FIG. 6A

DECREASED
NETWORK LOAD

FIG. 6B

CONTRACTED DYNAMIC
DATA STRUCTURE

FIG. 6C

METHOD AND SYSTEM FOR DYNAMICALLY MANAGING DATA STRUCTURES TO OPTIMIZE COMPUTER NETWORK PERFORMANCE

BACKGROUND OF THE INVENTION

1. Field of the Invention

The present invention relates in general to computer data structures and more particularly to a method and a system for dynamically managing data structures in a computer network environment to optimize performance.

2. Related Art

Computer networks are widespread and vitally important to many types of enterprises including businesses, universities and government. In general, a computer network is two or more computers (or associated devices) that are connected by communication facilities. A computer network may include a server, which is a computer that provides shared resources to users of the network, and a client, which is a computer that accesses the shared network resources provided by the server using the communication facilities. For example, the Internet (via the World Wide Web (WWW)) is a public wide-area network (WAN) environment that enables remote clients to request and receive data located on a server.

Activity on a computer network is a dynamic process. At any given time, the number of network devices (such as client machines) connected to the network and the amount of data flowing through the network varies. For example, an Internet Web server may have a high network load during evening hours when people are not at work but may have a low network load during the middle of the day. In this situation, a high network load means that a network is handling a large number of client requests while a low network load means that the network is handling only a few client requests.

Even though network activity is dynamic, data structures associated with the network typically are static or fixed. A data structure is a mechanism for organizing and grouping related pieces of data. A fixed data structure is one where the size of the structure does not vary. Several types of data structures are available, such as data files, data arrays, data trees, data tables and hash tables. Some of these data structures may be used in a network to store network connection information. This connection information includes a list of which clients are connected to the network and the client addresses. Whenever the server needs to know the address of a client the server can access this information stored in the data structure.

Ordinarily, a hash table has individual cells with each cell identified by a rows and columns. Ideally, only a single piece of data (such as a single client address) is stored a cell of the hash table. However, because of the finite size of the hash table, two or more pieces of data frequently are located in the same cell. Thus, two or more client addresses may be stored in a single cell of the hash table.

A mechanism called a "linked list" is used whenever two or more pieces of data are contained in a single cell of the hash table. A linked list (or a data chain) is a list of the pieces of data contained in that cell. Whenever an application is searching for a particular piece of data within a cell containing multiple pieces of data, the search starts at the top of the linked list and continues down the list until the desired piece of data is found.

Current data structure management techniques choose the size of the hash table by taking into account the balance between the cost of using a great deal of memory and the time required to search through long linked lists. Specifically, if a small amount of data is anticipated then the size of the hash table should be fixed at a small value to save valuable memory. On the other hand, if a large amount of data is anticipated then the size of the hash table should be fixed at a large value to reduce the amount of time spent searching through long linked lists for a desired piece of data. As a compromise, current data structure management techniques usually fix the hash table size at a reasonably large value to accommodate the largest amount data anticipated.

One problem, however, with fixing the hash table size at a large value is that performance of the network is optimized only when there are large amounts of data in the hash table, i.e., at high network loads. At lower network loads, maintaining this large hash table size wastes memory. At the other extreme, if the hash table size is fixed at a small value then a great deal of time is spent searching through a long linked list for a desired piece of data. Both of these situations are adverse to performance of the network.

Therefore, what is needed is a method and system for dynamically managing data structures so that the size of the data structure varies depending on the amount of data therein. Moreover, what is needed is a method and system for dynamically managing data structures that provides a uniform data distribution across the data structure and reduce the time spend searching linked lists of the data structure. What is also needed is method and system for dynamically maintaining these conditions over varying network loads to deliver optimal network performance over a wide range of network loads.

SUMMARY OF THE INVENTION

To overcome the limitations in the prior art as described above and other limitations that will become apparent upon reading and understanding the present specification, the present invention includes a method and a system for managing a storage space for data in a computer network. A storage area is provided that is used to store the data. The storage space has a size and is divided into cells. The present invention expands the size of a storage area used to store network data during heavy network loads. This may be achieved, for example, by adding a cell to the storage space. Conversely, the storage space is contracted during periods of light network use. This may be achieved, for example, by removing a cell from the storage space. To determine when to contract or expand the storage space, a threshold value is defined that represents the amount of data that can be stored in each cell. If the amount of data stored in a cell is greater than a threshold value, the size of the storage space is increased. On the other hand, if the amount of data stored in a cell is less than a threshold value, the size of the storage space is decreased.

Each cell of the storage space can contain a linked list that link multiple data items. Expanding the size of the storage space reduces the amount of time spent searching a linked list for a desired data items. Contracting the size of the storage space reduces the amount of memory required to store the data. In this manner, the present invention is capable of dynamically adapting the size of the storage space to changing amounts of data and ensures that network performance is constantly optimized.

The method of the present invention includes managing storage space for data in a computer network by providing a base storage space having a base size. An amount of data within the storage space is compared to a threshold value and the size is changed in response to the comparison. Thus, the size is increased when the amount of data is greater than the threshold value and decreased when the amount of data is less than the threshold value. The present invention also includes a dynamic data structure management module that changes and dynamically manages the size of the storage space in accordance with the method of the present invention.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not by the preceding summary or the following detailed description.

BRIEF DESCRIPTION OF THE DRAWINGS

The present invention can be further understood by reference to the following description and attached drawings that illustrate the preferred embodiments. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction

Activity on a network is dynamic in nature. For example, at any given time a network server may be fulfilling numerous requests while at another time the same server may be performing little or no tasks. However, even though network activity is dynamic the data structures that support the network (such as data structures that contain client addresses) have a fixed size. Although a fixed size data structure optimizes network performance for a specific amount of data and network load, the server is usually only infrequently at this network load and the frequently the size of the fixed data structure is mismatched with the network load. Mismatching impairs network performance and efficiency.

The present invention alleviates these problems associated with fixed size data structures and optimizes network performance by dynamically adjusting the size of a data structure (or data storage space) so that the size of the storage space is always matched to a current amount of data and network load. This dynamic adjustment of storage space size helps to optimize network performance. The present invention provides dynamic adaptation of storage space size such that the size varies depending on the amount of data stored therein. Thus, at high network loads, when there is a large amount of data to be stored in a storage space, the storage space size is increased. At low network loads, the storage space contains a small amount of data and the storage space size is decreased.

II. Exemplary Operating Environment

The following discussion is designed to provide a brief, general description of a suitable environment in which the present invention may be implemented. It should be noted that FIGS. 1 and 2 depict only one of several ways in which the present invention may be implemented.

Figure 1:
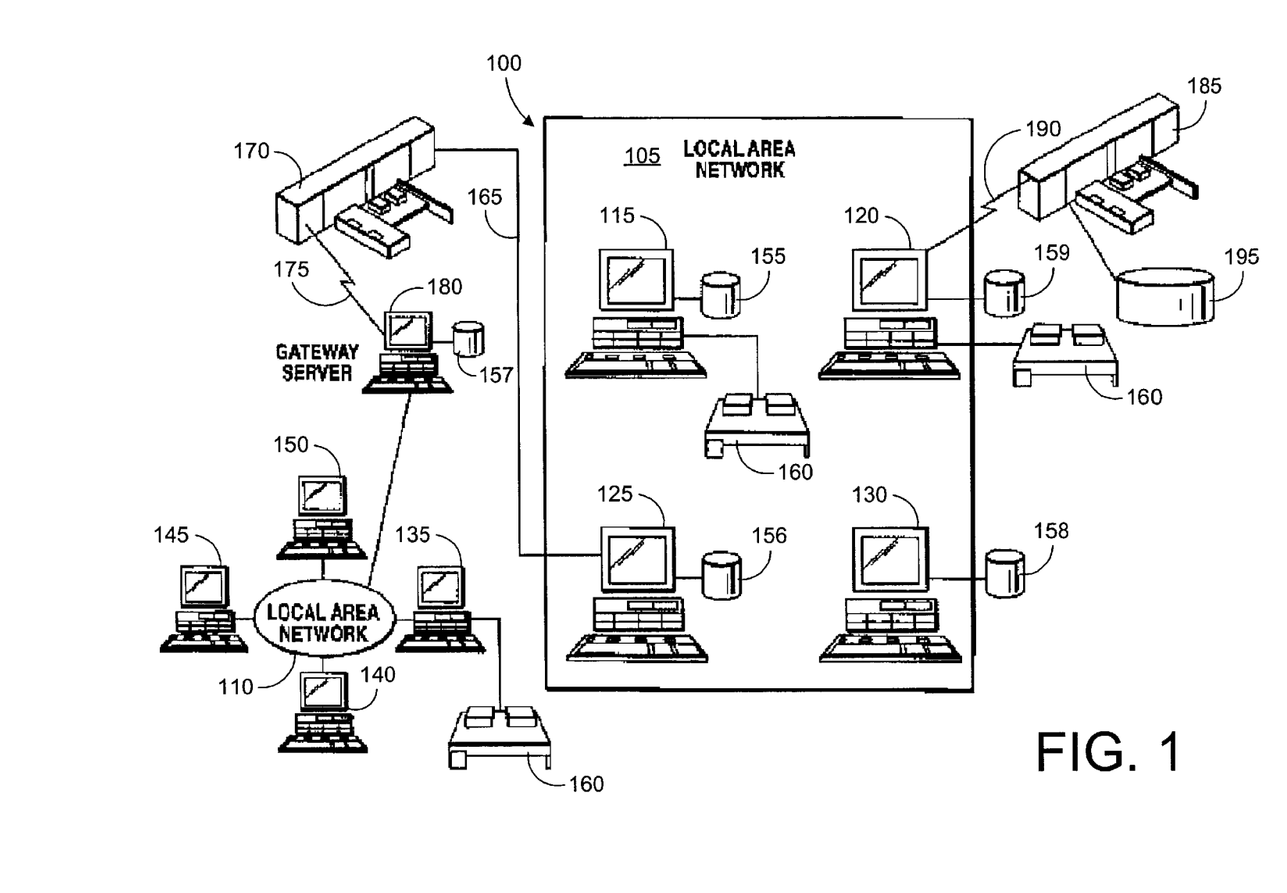
FIG. 1 illustrates a conventional hardware configuration for use with the present invention.

FIG. 1 illustrates a conventional hardware configuration for use with the present invention. In particular, an enterprise computer system 100 may include one or more networks, such as local area networks (LANs) 105 and 110. Each of the LANs 105, 110 includes a plurality of individual computers 115, 120, 125, 130, 135, 140, 145 and 150. The computers within the LANs 105, 110 may be any suitable computer such as, for example, a personal computer made by International Business Machines (IBM) Corporation, located in Armonk, N.Y. Typically, each of the plurality of individual computers is coupled to storage devices 155, 156, 157, 158 and 159 (such as a disk drive or hard disk) that may be used to store data (such as modules of the present invention) and computer-executable instructions in accordance with the present invention. Each of the plurality of individual computers 115, 120, 125, 130, 135, 140, 145, 150 also may be coupled to an output device 160 (such as a printer) for producing tangible output. The LANs 105, 110 may be coupled via a first communication link 165 to a communication controller 170, and from the communication controller 170 through a second communication link 175 to a gateway server 180. The gateway server 180 is preferably a personal computer that serves to link the LAN 105 to the LAN 110.

The computer system 100 may also include a plurality of mainframe computers, such as a mainframe computer 185, which may be in communication with one or more of the LANs 105, 110 by means of a third communication link 190. The mainframe computer 185 is typically coupled to a storage device 195 that is capable of serving as a remote storage for one or more of the LANs 105, 110. Similar to the LANs 105, 110 discussed above, the storage device may be used to store data and computer-executable instructions in accordance with the present invention. Those skilled in the art will appreciate that the mainframe computer 185, the LAN 105 and the LAN 110 may be physically located a great distance from each other. By way of example, a user may use a client system of the mainframe computer 185 to access information located on a server of the LAN 105.

Figure 2:
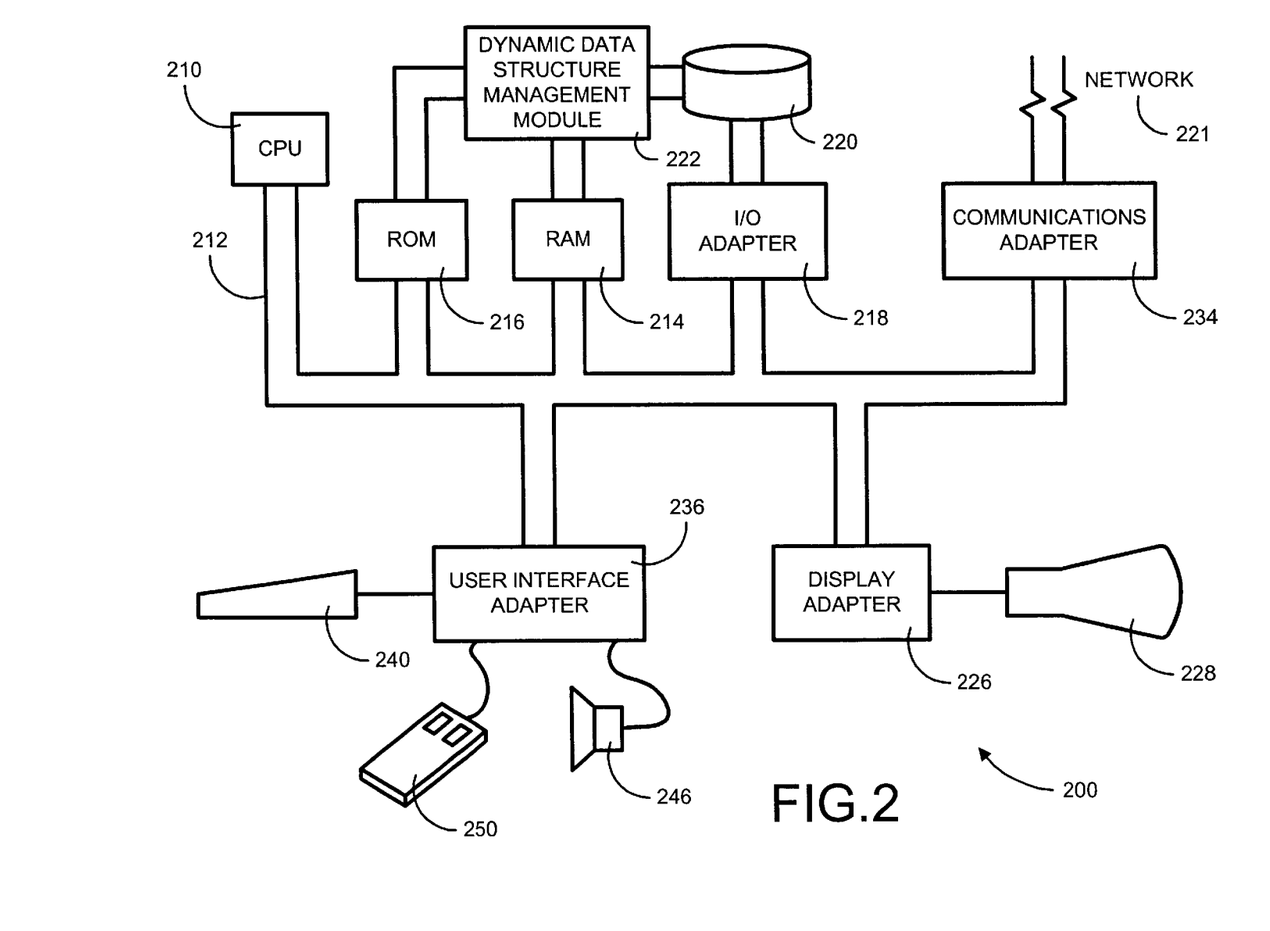
FIG. 2 is a block diagram of an individual computer system of FIG. 1 incorporating the present invention and is shown for illustrative purposes only.

FIG. 2 is a block diagram of an individual computer system (such as a network server) of FIG. 1 incorporating the present invention and is shown for illustrative purposes only. A computer 200 includes any suitable central processing unit (CPU) 210, such as a standard microprocessor, and any number of other objects interconnected by a system bus 212. For purposes of illustration, the computer 200 includes memory such as random-access memory (RAM) 214, read-only memory (ROM) 216, and storage devices (such as hard disk or disk drives 220) connected to the system bus 212 by an input/output (I/O) adapter 218. The computer 200 may be a network server that is capable of connecting and interacting with a plurality of client machines over a communication channel (such as a network 221). Moreover, the network server is able to receive network requests from the plurality of client machines and serve up requested data to the client machines. Accordingly, as shown in FIG. 2, at least one of the memory devices (such as the RAM 214, ROM 216, and hard disk or disk drives 220) contains a dynamic data structure management module 222 in accordance with the present invention. Preferably, the dynamic data structure management module 222 contains computer-executable instructions for carrying out the present invention.

The computer 200 may further include a display adapter 226 for connecting the system bus 212 to a suitable display device 228. In addition, a user interface adapter 236 is capable of connecting the system bus 212 to other user interface devices, such as a keyboard 240, a speaker 246, a mouse 250 and a touchpad (not shown). In a preferred embodiment, a graphical user interface (GUI) and an operating system (OS) reside within a computer-readable media and contain device drivers that allow one or more users to manipulate object icons and text on the display device 228. Any suitable computer-readable media may retain the GUI and OS, such as, for example, the RAM 214, ROM 216, hard disk or disk drives 220 (such as magnetic diskette, magnetic tape, CD-ROM, optical disk or other suitable storage media).

III. General Overview and Components of the Invention

The dynamic data structure management module 222 of the present invention manages the size of dynamic data structures and provides dynamic adaptation of the data structures according to network load. The size of the dynamic data structures may expand or contract depending on the amount of data contained in the data structure. Thus, when network load is heavy and the data structure contains large amounts of data the dynamic data structure management module 222 will expand the data structure to reduce the time spent searching for a data item. Conversely, if the network load is light and the data structure contains small amounts of data the dynamic data structure management module 222 will contract the data structure to reduce memory requirements. In this manner the performance of the network is optimized.

Figure 3A:
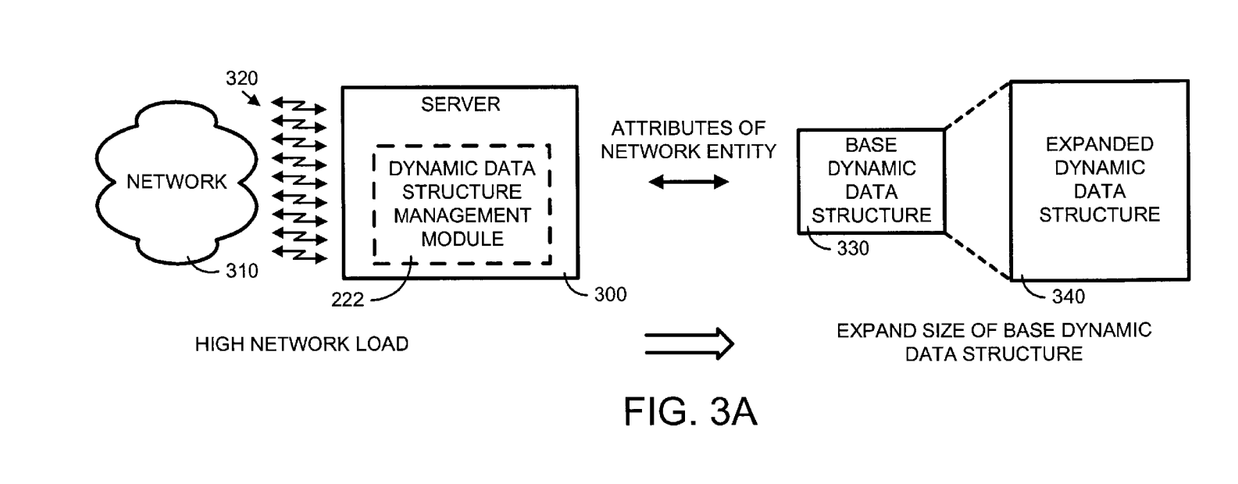
FIG. 3A is a general block diagram illustrating an overview of the expansion of a dynamic data structure according to the present invention.
Figure 3B:
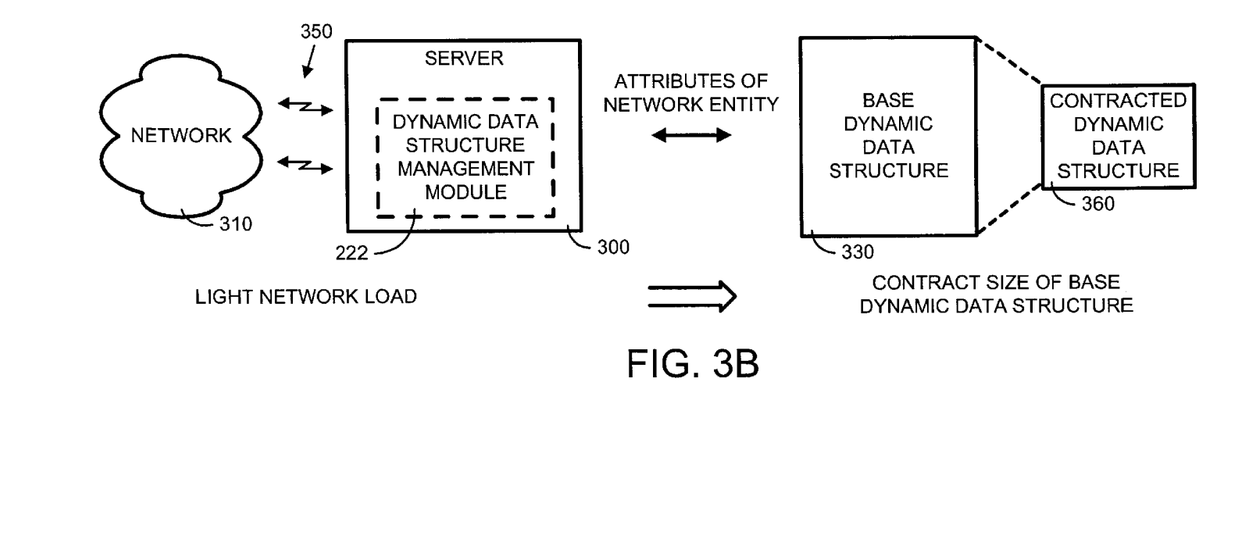
FIG. 3B is a general block diagram illustrating an overview of the contraction of a dynamic data structure according to the present invention.

FIGS. 3A and 3B are block diagrams illustrating the expansion and contraction of a data structure according to the present invention. FIG. 3A illustrates the expansion of a dynamic data structure, and a server 300 receives network data (such as network requests) from a network 310. In FIG. 3A the network load is heavy as shown by the large number of network processes 320. These network processes include network requests to the server 300 from over the network 310 and transmissions from the server 300 out over the network 310. The server 300 includes the dynamic data structure management module 222 for managing dynamic data structures on the server 300.

A dynamic data structure having a base size (or base dynamic data structure) 330 contains attributes of a network entity. A network entity may include, for example, connection information (such as protocol control blocks (PCBs)) or other information that is used by the server. The attributes of a network entity (such as connection values for PCBs) are stored as data in the base dynamic data structure 330, with each individual attribute being a data item. For example, if PCB connection values are contained in the base dynamic data structure 330 the server 300 may access the base dynamic data structure 330 to obtain a needed connection value.

As network load increases the number of data items in the base dynamic data structure 330 also increase. As explained in detail below, when a threshold is reached the dynamic data structure management module 222 expands the base dynamic data structure 330 to create a new expanded dynamic data structure 340. The expanded dynamic data structure 340 is larger in size than the base dynamic data structure 330 and allows data items within to be found more quickly, thus reducing search times.

FIG. 3B illustrates the contraction of a dynamic data structure according to the present invention. As in FIG. 3A, the server 300 receives and transmits network data over the network 310. In FIG. 3B, however, the network load is light as shown by the small number of network processes 350. As network load decreases the number of data items in the base dynamic data structure 330 also decrease. As explained in detail below, when a threshold is reached the dynamic data structure management module 222 contracts the base dynamic data structure 330 to create a new contracted dynamic data structure 360. The contracted dynamic data structure 340 is smaller in size than the base dynamic data structure 330 and reduces the amount of memory usage.

IV. Operation and Working Example

Generally, the method of the present invention includes a method for managing a data structure in a computer network by providing a dynamic data structure having a size capable of being dynamically varied depending on the amount of data stored therein. Dynamically varied means that the size of the dynamic data structure can be changed while the data structure is being used. Moreover, dynamically varying the size of the dynamic data structure includes expanding the dynamic data structure when the amount of stored data therein is large and contracting the dynamic data structure when the amount of stored data therein is small. In a preferred embodiment, the amount of data stored within the dynamic data structure is large if the amount of data exceeds an expansion threshold and the amount of data is small if the amount of data falls below a contraction threshold. These expansion and contraction thresholds are discussed in detail below.

Figure 4:
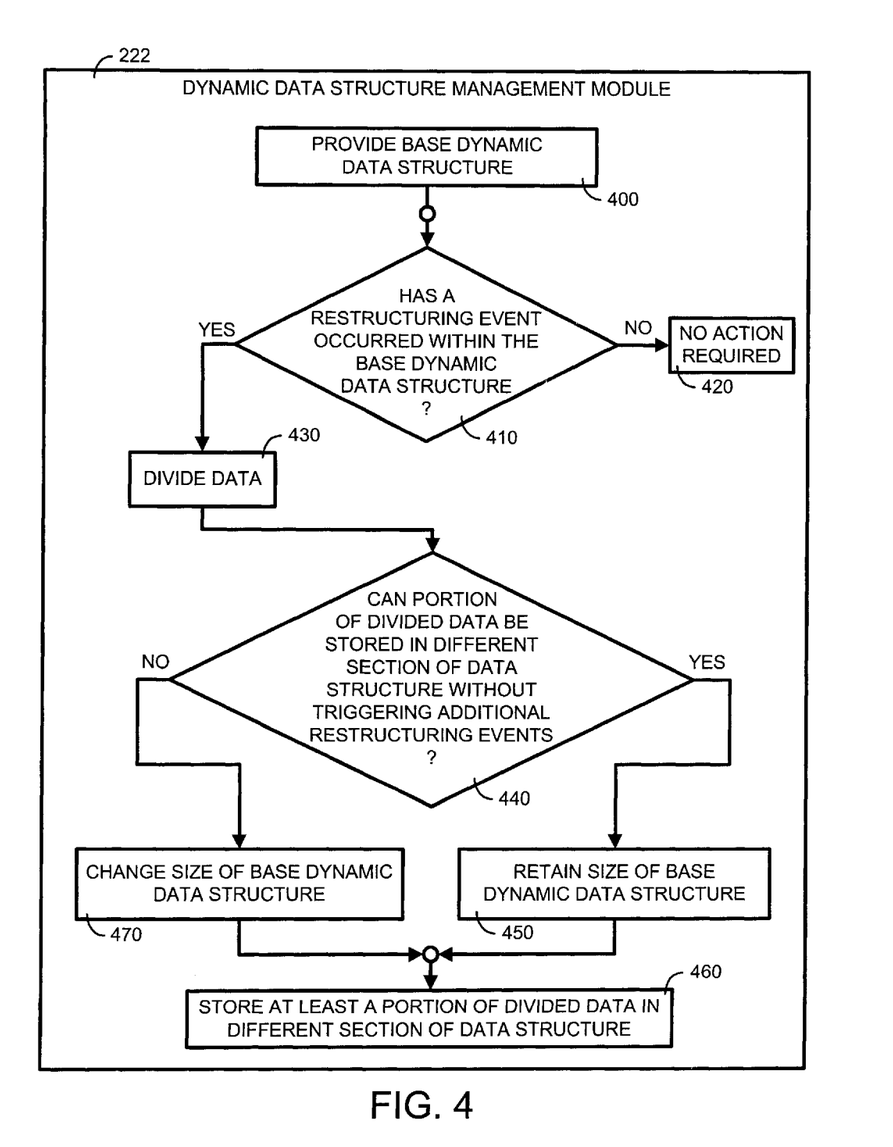
FIG. 4 is a flow diagram illustrating the general operation of the dynamic data structure management module shown in FIG. 2.

FIG. 4 is a flow diagram illustrating the general operation of the dynamic data structure management module 222 shown in FIG. 2. First, a dynamic data structure having base size is provided (box 400). This base size may be any size that is suitable for the purpose for which the dynamic data structure is being used. Next, the module 222 determines whether a restructuring event has occurred (box 410). The restructuring event can be any event whereby it is determined that the data within the data structure needs to be rearranged or the data structure needs to be resized. In a preferred embodiment, a restructuring event occurs when a contraction or expansion threshold is applied to a linked list of data items sharing a cell in the data structure. An expansion threshold may be defined such that if the number of data items in the linked list (or a data chain) exceeds the expansion threshold then a restructuring event has occurred. Similarly, a contraction threshold may be defined such that if the number of data items in the linked list (or data chain) is less than the contraction threshold then a restructuring event also has occurred. By way of example, the dynamic data structure management module 222 may set an expansion threshold value equal to 6. If the number of data items within a single cell of the base dynamic data structure exceeds the expansion threshold value of 6 then the module 222 expands the size of the base dynamic data structure. Similarly, if the module 222 sets a contraction threshold value of 3 and the number of data items within a single cell of the base dynamic data structure is less than 3, the module 222 contracts the size of the base dynamic data structure.

If a restructuring event has not occurred then no action is required (box 420) by the dynamic data structure management module 222. On the other hand, if a restructuring event has occurred then data within the data structure is divided (box 430). It is then determined whether at least a portion of the divided data can be stored in a different section of the data structure without triggering an additional restructuring event (box 440). As explained in detail in the working example presented below, in a preferred embodiment the dynamic data structure is a hash table and multiple data items in the same cell are chained together. When a restructuring event occurs (such as if the chain length exceeds an expansion threshold) the chain is divided and a portion of the divided chain is stored in another cell. The dynamic data structure management module 222 determines whether there are any cells that can store the portion of the divided data without exceeding the expansion threshold.

If a portion of the divided data can be stored in a different section of the data structure without triggering additional restructuring events, then the size of the base dynamic data structure is retained (box 450) and the portion of the divided data is stored in a different section of the base dynamic data structure (box 460). On the other hand, if a portion of the divided data cannot be stored in a different section of the data structure without triggering additional restructuring events, then the size of the base dynamic data structure is changed (box 470). Depending on how the restructuring event is defined, the size of the base dynamic data structure may be expanded or contracted. After resizing, the portion of the divided data is stored in a different section of the data structure (box 460), such as a new section of an expanded data structure. The dynamic data structure management module 222 then returns to checking whether a restructuring event has occurred (box 410).

In a preferred embodiment if the portion of the divided data can be stored in a different cell of the hash table without the chain of the cell exceeding an expansion threshold or falling below a contraction threshold, then the portion of the divided data is stored in a different cell of the hash table. Conversely, if the portion of the divided data cannot be stored in a different cell of the hash table without exceeding an expansion threshold or falling below a contraction threshold, then the size of the hash table is changed. If the chain of a cell exceeds the expansion threshold then the size of the hash table is increased. If the chain of the cell falls below the contraction threshold then the size of the hash table is decreased. If the size of the hash table has been increased, then the portion of the divided data is stored in a new cell of the hash table. If the size of the hash table has been decreased, then the portion of the divided data is stored in a remaining hash table cell.

In order to illustrate the operation of the present invention, a working example is presented. It should be noted that this example is only one of many implementations of the present invention that is possible, and is provided for illustrative purpose only. In this working example, the dynamic data structure is a hash table that contains network connection information including the attributes of PCBs. The size of the hash table is equal to 2 and the expansion threshold value is equal to 4. In the context of a hash table, the expansion threshold value of means that if the number of data items per hash chain is greater than 4 then hash table is expanded and the hash chain is split. In FIGS. 5 and 6, and index of the hash table is represented in square brackets ([ ]) and the hash chains are represented by hash keys that are linked by arrows (→).

In this working example, the hash keys are generated by applying a hash function on the PCB attributes that are being stored in the hash table. Thus, the hash of the PCB attributes is equal to the hash key, hash (PCB attributes)=k(the hash key)

and each PCB attribute having a hash key, k, is mapped to a hash table entry index, h, such that, h=k MOD SZ where SZ equal the size of the hash table (or 2 in this working example) and MOD is a modulus operator corresponding to a divisional remainder. For example, if k=21 and SZ=2, then h=(21) MOD (2)=1.

Figure 5A:
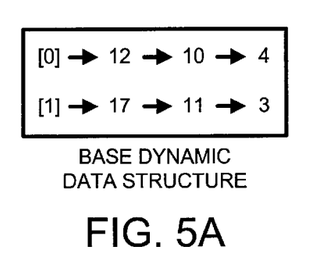
FIGS. 5A through 5E illustrate a detailed working example of the expansion of a dynamic data structure according to the present invention.
Figure 5B:
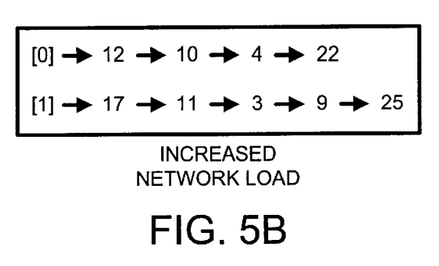

Referring now to FIGS. 5A through 5E, illustrated is a detailed working example of the expansion of a dynamic data structure according to the present invention and the above properties of the hash table. FIG. 5A shows a base dynamic data structure having two cells (or lines represented by [0] and [1]) and each cell having a data (or hash) chain of individual data items consisting of PCB attribute values. Thus, cell [0] contains a hash chain having values 12, 10, 4 and cell [1] contains a hash chain having value 17, 11 and 3. In FIG. 5B, the network load has been increased thereby increasing the length of the hash chains in cells [0] and [1]. Note that cell [1] has a hash chain length that exceeds the expansion threshold by one value (i.e. 5 values in the hash chain exceeds the expansion threshold of 4).

Figure 5C:
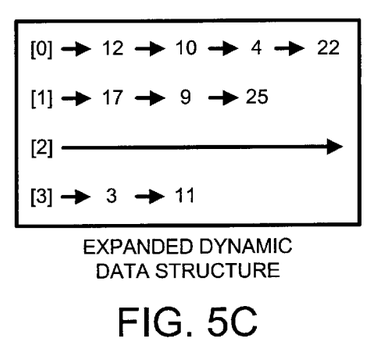

Once the expansion threshold is exceeded, the present invention expands the hash table and, in this working example, sets the size (SZ) equal to 2 times the previous size (or SZ(new)=2*2=4). FIG. 5C shows the expanded hash table having 4 cells ([0], [1], [2] and [3]) instead of the original two cells ([0] and [1]). Because cell [1] caused the expansion, the values of its hash chain are divided among the corresponding cells in the expanded hash table (i.e. cells [1] and [3]). The division is performed by applying the same hash function, namely, h=k MOD SZ where SZ is now equal to 4. Referring to FIG. 5C, both cells [0] and [2] point to the same chain (as represented by the long arrow in cell [2]) because they are not full and there is no need to modify them. This means that the dynamic data structure management module must perform a very low cost operation of copying pointers to the hash chains for cells that did not exceed the expansion threshold.

Figure 5D:
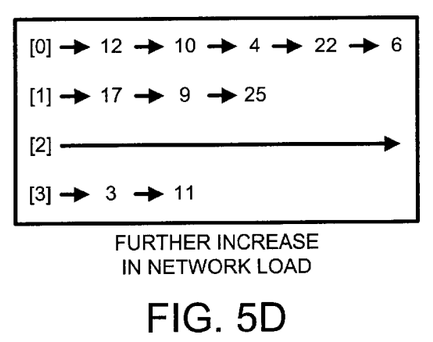
Figure 5E:
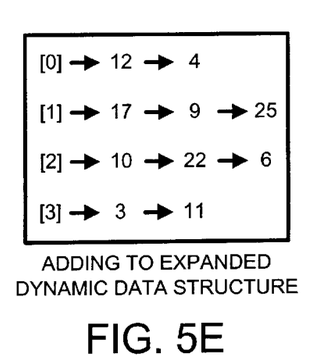

In FIG. 5D the hash chain in cell [0] becomes full and exceeds the expansion threshold. In this situation the size of the hash table does not need to be expanded because there is still room for a new hash chain. Thus, in FIG. 5E the hash chains of cells [0] and [2] are separated into their own individual hash chains. Moreover, the hash table still has more space to add additional values to the hash chains in each cell. In this manner, the present invention reduces search time by reducing the length of the hash chains in response to the increased network load.

Figure 6A:
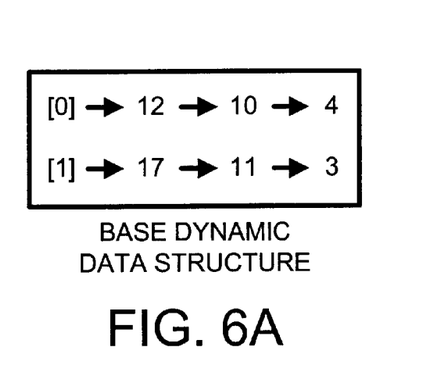
FIGS. 6A through 6C illustrate a detailed working example of the contraction of a dynamic data structure according to the present invention.
Figure 6B:
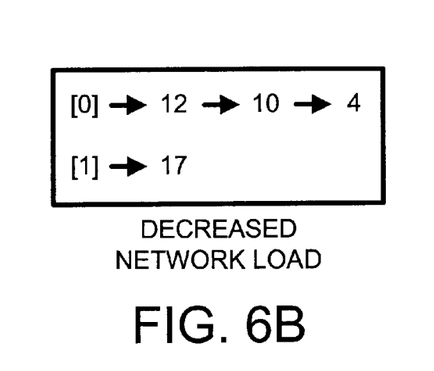
Figure 6C:
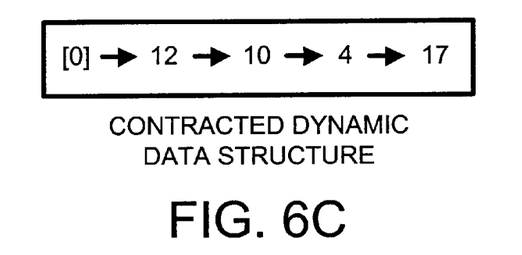

FIGS. 6A through 6C illustrate a detailed working example of the contraction of a dynamic data structure according to the present invention and the above properties of the hash table. In this working example, the contraction threshold is equal to 2. FIG. 6A shows a base dynamic data structure having cells [0] and [1] with each cell having a hash chain of individual data items consisting of PCB attribute values. In FIG. 6B the network load has been decreased thereby decreasing the length of the hash chain in cell [1] from three values to one. This means that the hash chain length of cell [1] is now less than the contraction threshold (i.e. 1 values in the hash chain is less than the contraction threshold of 3) and hash table is contracted. FIG. 6C shows that contracted hash table having only a single cell [0] will a hash chain length of four values. In this manner, the present invention preserves memory resources by dynamically reducing the size of the hash table in response to the decreased network load.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A method of managing storage space used for storing data items on a storage device of a computer network, comprising:

storing the data items within a storage space having an initial size;

defining a threshold number of data items to be stored in the storage space;

varying the initial size of the storage space when the number of data items is greater than or less than the threshold number of data items; and maintaining variance of the size of the storage space during varying transfer loads of the data items within the computer network.

2. The method as set forth in claim 1, wherein the size of the storage space is expanded if the number of data items is greater than the threshold number of data items.

3. The method as set forth in claim 1, wherein the size of the storage space is contracted if the number of data items is less than the threshold number of data items.

4. The method as set forth in claim 1, wherein the storage space is divided into a plurality of cells.

5. The method as set forth in claim 4, wherein the threshold number of data items is the maximum number of data items that each of the plurality of cells may contain.

6. The method as set forth in claim 4, wherein the storage space is expanded one cell at a time.

7. The method as set forth in claim 4, wherein if one or more of the plurality of cells contains enough storage space to store data items in a particular cell, the data items are stored in the one or more of the plurality of cells and the particular cell is removed.

8. The method as set forth in claim 7, further comprising:
   determining that a linked list of data items in a particular cell is greater than the threshold number of data items; and
   adding a new cell to the hash table.

9. The method as set forth in claim 7, further comprising:
   determining that a linked list of data items in a particular cell is less than the threshold number of data items; and
   deleting the particular cell.

10. The method as set forth in claim 1, wherein the storage space is a hash table having plurality of cells and at least one of the plurality of cells contains a linked list of data items.

11. A computer-readable medium having computer-executable instructions thereon for performing the method as set forth in claim 1.

12. A method for managing a data structure having data items stored therein, comprising:

separating the data structure into a number of cells;

defining a threshold number of data items;

determining whether the number of cells should be changed based on a comparison between the threshold number and a number of data items stored within each cell; and maintaining the comparison between the threshold number and the number of data items stored within each cell during varying transfer loads of the data items within a computer network.

13. The method as set forth in claim 12, further comprising:
    determining that the number of data items in a cell is greater than the threshold number of data items; and
    increasing the number of cells.

14. The method as set forth in claim 12, further comprising:
    determining that the number of data items in a cell is less than the threshold number of data items; and
    decreasing the number of cells.

15. The method as set forth in claim 12, wherein the number of data items within a cell are contained in a linked list.

16. The method as set forth in claim 15, further comprising adding a new cell if the number of data items in the linked list is greater than the threshold number of data items.

17. The method as set forth in claim 15, further comprising deleting an existing cell if the number of data items in the linked list of the existing cell is less than the threshold number of data items.

18. The method as set forth in claim 15, further comprising:
    rearranging the data items between linked lists in the number of cells based on the comparison;
    determining that the number of data items in a linked list of a first cell is greater than the threshold number of data items; and
    adding one of the data items in the linked list of the first cell to another linked list in a second cell such that the number of data items in the linked list of the second cell is not greater than the threshold number of data items.

19. The method as set forth in claim 15, further comprising:
    rearranging the data items between linked lists in the number of cells based on the comparison;
    determining that the number of data items in a linked list of a first cell is less than the threshold number of data items;
    adding the number data items in the linked list of the first cell to another linked list in a second cell; and
    deleting the first cell.

20. In a computer system having a processor for processing data items, a memory containing a data structure having a size for storing data items, and a display for displaying processed data items to a user, a data structure management system for managing the data items stored within the data structure, comprising:

a dynamic data structure management module that defines a threshold number of data items to be stored in the data structure and expands the size of the data structure when the number of data items is greater than the threshold number and contracts the size of the data structure when the number of data items is less than the threshold number; and     a maintain module that maintains variance of the size of the data structure during varying transfer loads of the data items within the computer system.

* * * * *